United States Patent
Shin et al.

(10) Patent No.: US 8,226,759 B2
(45) Date of Patent: Jul. 24, 2012

(54) INK COMPOSITION OF INKJET RECORDING AND METHOD THEREOF

(75) Inventors: Dong-houn Shin, Seoul (KR); Heung-sup Park, Suwon-si (KR); Ho-ryul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 12/647,156

(22) Filed: Dec. 24, 2009

(65) Prior Publication Data

US 2010/0186626 A1  Jul. 29, 2010

(30) Foreign Application Priority Data

Jan. 28, 2009  (KR) .................. 10-2009-0006609

(51) Int. Cl.
*C09D 11/02* (2006.01)

(52) U.S. Cl. .......... 106/31.59; 106/31.58; 106/31.86; 106/31.89

(58) Field of Classification Search ........... 106/31.59, 106/31.58, 31.89, 31.86; 347/86, 100
See application file for complete search history.

(56) References Cited

U.S. PATENT DOCUMENTS

| | | | | |
|---|---|---|---|---|
| 5,782,965 A * | 7/1998 | Ishida et al. | | 106/31.59 |
| 6,736,887 B1 * | 5/2004 | Tsutsumi et al. | | 106/31.89 |
| 7,060,123 B2 * | 6/2006 | Hakamada et al. | | 106/31.59 |
| 7,115,161 B2 * | 10/2006 | Magdassi et al. | | 106/31.59 |
| 7,147,700 B2 * | 12/2006 | Hoshi et al. | | 106/31.89 |
| 7,172,648 B2 * | 2/2007 | Ichikawa | | 106/31.59 |
| 7,172,653 B2 * | 2/2007 | Reisacher et al. | | 106/31.89 |
| 7,758,685 B2 * | 7/2010 | Park | | 106/31.59 |
| 8,129,321 B2 * | 3/2012 | Lee et al. | | 510/170 |
| 2006/0000387 A1 * | 1/2006 | Liu et al. | | 106/31.59 |
| 2007/0131144 A1 * | 6/2007 | Winter et al. | | 106/31.89 |
| 2008/0066644 A1 * | 3/2008 | Park et al. | | 106/31.43 |

* cited by examiner

*Primary Examiner* — Helene Klemanski

(74) *Attorney, Agent, or Firm* — Stanzione & Kim, LLP

(57) ABSTRACT

An ink composition of inkjet recording which includes at least one surfactant containing benzophenone polyoxyethylene glycol-based compound, a colorant, and a solvent. A multi-color ink set that includes the ink composition of inkjet recording, a cartridge of inkjet recording, and an inkjet recording apparatus are also provided.

20 Claims, 3 Drawing Sheets

INK COMPOSITION OF INKJET RECORDING AND METHOD THEREOF

CROSS-REFERENCE TO RELATED APPLICATIONS

This application claims priority under 35 U.S.C §119(a) from Korean Patent Application No. 10-2009-0006609, filed on Jan. 28, 2009, in the Korean Intellectual Property Office, the disclosure of which is incorporated herein in its entirety by reference.

BACKGROUND

1. Field of the Invention

The present general inventive concept relates to an ink composition of inkjet recording, and more particularly, to an ink composition of inkjet recording, wherein the ink composition may prevent low-quality image printing caused by low ink-refill balance in a thermal inkjet recording apparatus.

2. Description of the Related Art

In an inkjet recording method, an image composed of a plurality of "dots" is recorded by ejecting ink droplets onto a printing medium from nozzles formed on a printhead of an inkjet printer. Inkjet printing is less expensive than other printing methods, a printing quality is high, and a color image can be easily formed. Ink used in inkjet printing is manufactured by dissolving or dispersing a water-soluble dye or a pigment in a solvent that contains water and selectively a water-miscible organic solvent. If necessary, an additive, for example, a surfactant, may be added to the solvent.

Inkjet printers may be classified into two types according to an ejection method of the ink droplets. A first type is a piezoelectric type that ejects ink by using a piezoelectric device and the second type is a thermal type that ejects ink by using a heat generating device.

The thermal type inkjet printer includes an inkjet printhead having a heat generating device that is installed in an ink chamber to heat ink and a driving circuit, such as a logic integrated circuit, to drive the heat generation device. Ink in the ink chamber generates bubbles by being locally heated by the heat generating device. As a result, ink droplets are formed in the ink chamber, and are ejected onto a printing medium through nozzles. In order to fill an empty space generated in the ink chamber due to the ink ejection, fresh ink must be supplied to the ink chamber from an ink tank through a supply line. At this point, if an ink-refill balance is low, low-quality image printing can occur when an image printing operation is consecutively performed. However, in order to address this problem, a fluidity of the ink in a channel formed between the ink chamber and the ink tank may be improved by modifying a channel structure design or changing a composition of the ink.

Due to the low ink-refill balance, a shortage of ink may occur in the ink chamber. In this case, when the ink is consecutively ejected, a cooling operation of a surface of the inkjet printhead may not be achieved, and thus, a surface passivation layer of the heat generating device may be damaged. The damage of the surface passivation layer can cause minute holes in a surface of a resistor, and thus, a lifetime of the resistor is reduced. If ink ejection is performed numerous times, the surface passivation layer may be corroded due to oxidation by cavitation and a chemical reaction with the high temperature ink. The corroded surface passivation layer damages an electrical insulating film, and, as a result, a circuit that supplies power to the resistor may be disconnected or a thermal conductivity of the resistor is reduced, thereby reducing a stability of an ink ejection velocity.

In order to eject dots at accurate positions on a recording medium, a variation in the ejection velocity in each of the nozzles, or between the nozzles, must be minimized. A dot position error reduces the quality of a printed image. When a volume of the ink droplets is small, the dot position error is easily noticed. However, in order to further increase a printing resolution, it is necessary to reduce a size of the ejected ink droplets. Also, a lifetime of the inkjet printhead must be increased in order to reduce costs associated therewith. However, if a normal ink-refill balance is not performed, ink that is to be supplied to the ink chamber may not be sufficient. In this case, ink droplets ejected on a recording medium may be small and may result in an ejection stability problem due to an excessive heat generated on a surface of the inkjet printhead.

To achieve a smooth ink-refill balance, a dye or a pigment in the channel may be improved to have a high fluidity and a stability or an emulsifying agent or a co-solvent may be employed to improve the ink-refill balance. However, when the dye or the pigment is changed, a variation of the color related to the image quality and the durability of the printed image is caused. Thus, it is difficult to improve the fluidity of ink by changing the dye or pigment, without affecting the quality of the printed image.

SUMMARY

The present general inventive concept provides an ink composition of inkjet recording, the ink composition having a high ink-refill balance.

Additional features and/or utilities of the present general inventive concept will be set forth in part in the description which follows and, in part, will be obvious from the description, or may be learned by practice of the general inventive concept.

The present general inventive concept also provides an ink composition of inkjet recording whereby ink droplets may be consecutively ejected for an extended period of time by an inkjet recording apparatus.

The present general inventive concept also provides a multi-color ink set including the ink composition.

The present general inventive concept also provides a cartridge to inkjet record, the cartridge including multi-color ink sets.

The present general inventive concept also provides an inkjet recording apparatus having the cartridge to inkjet record.

Exemplary embodiments of the present general inventive concept may be achieved by providing an ink composition of inkjet recording, the ink composition including at least one surfactant including a benzophenone polyoxyethylene glycol-based compound as illustrated in Chemical Formula 1, a colorant, and a solvent.

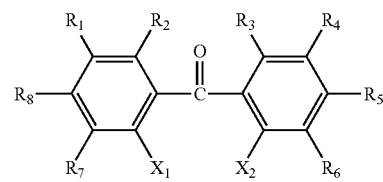

<Chemical Formula 1>

In Chemical Formula 1, $R_1$, $R_2$, $R_3$, $R_4$, $R_5$, $R_6$, $R_7$, and $R_8$ may each independently be hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 heteroalkyl group, a substituted or unsubstituted C6-C30 aryl group, or a substituted or unsubstituted C4-C30 heteroaryl group, and $X_1$ and $X_2$ are each independently $(CH_2CH_2O)_nH$, $(CH(CH_3)CH_2)_nH$ or $(CH_2CH_2O)_{m1}(CH(CH_3)CH_2)_{m2}H$, n and m1+m2 are each independently an integer of 1 to 10, and m1 and m2 are each independently an integer of 1 to 9.

The content of the benzophenon polyoxyethylene glycol-based compound may be about 0.1 to about 20 parts by weight, the content of the colorant may be about 0.1 to about 15 parts by weight, and the content of the solvent may be about 70 to about 90 parts by weight respectively based on 100 parts by weight of a total weight of the ink composition.

The surfactant may further include at least one compound selected from compounds represented by Chemical Formula 2 through 5 illustrated below in a content of about 0.1 to about 15 parts by weight based on 100 parts by weight of a total weight of the ink composition.

<Chemical Formula 2>

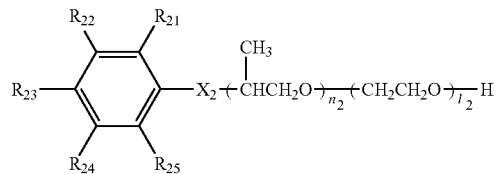

In Chemical Formula 2, $R_{21}$, $R_{22}$, $R_{23}$, $R_{24}$, and $R_{25}$ may each independently be hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 heteroalkyl group, a substituted or unsubstituted C6-C30 aryl group, or a substituted or unsubstituted C4-C30 heteroaryl group.

$X_2$ is a simple bond, oxygen, sulphur, $NR_{26}$, a substituted or unsubstituted C1-C20 alkylene group, a substituted or unsubstituted C1-C20 hetero-alkylene group, a substituted or unsubstituted C6-C30 arylene group, a substituted or unsubstituted C4-C30 heteroarylene group, a substituted or unsubstituted C2-C20 alkenylene group, a substituted or unsubstituted C2-C20 hetero-alkenylene group, a substituted or unsubstituted C3-C30 cycloalkylene group, a substituted or unsubstituted C7-C30 aralkylene group, a carbonyl group, or an ester group, and $R_{26}$ indicates hydrogen, halogen, substituted or unsubstituted C1-C20 alkyl group, a substituted or unsubstituted C1-C20 heteroalkyl group.

$I_2$ and $n_2$ are each independently an integer of 0 to 100, and at least one of them is 1 or an integer larger than 1.

<Chemical Formula 3>

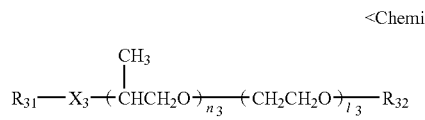

In Chemical Formula 3, $R_{31}$ and $R_{32}$ are each independently the same as $R_{21}$, $X_3$ is the same as $X_2$, and $I_3$ and $n_3$ are each independently an integer of 0 to 100, and at least one of them is 1 or an integer greater than 1.

<Chemical Formula 4>

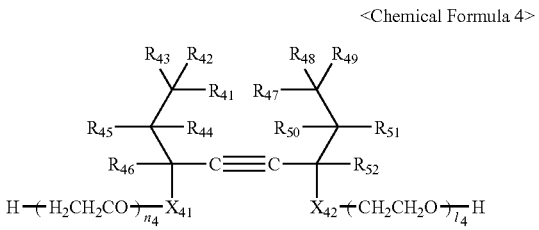

In Chemical Formula 4, $R_{41}$, $R_{42}$, $R_{43}$, $R_{44}$, $R_{45}$, $R_{46}$, $R_{47}$, $R_{48}$, $R_{49}$, $R_{50}$, $R_{51}$, and $R_{52}$ are respectively independently the same as $R_{21}$, $X_{41}$ and $X_{42}$ are each independently the same as $X_2$, and $I_4$ and $n_4$ are each independently an integer of 0 to 100, and at least one of them is 1 or an integer larger than 1.

<Chemical Formula 5>

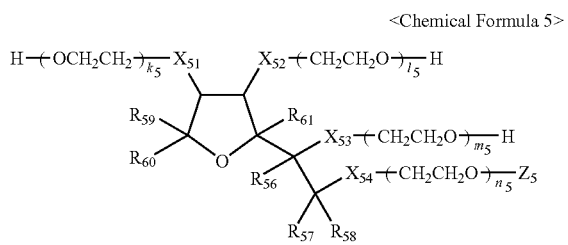

In Chemical Formula 5, $R_{56}$, $R_{57}$, $R_{58}$, $R_{59}$, $R_{60}$, and $R_{61}$ are each independently the same as $R_{21}$, $Z_5$ is the same as $R_{21}$, $X_{51}$, $X_{52}$, $X_{53}$ and $X_{54}$ are each independently the same as $X_2$, and $k_5$, $I_5$, $m_5$, and $n_5$ are respectively independently an integer of 0 to 100, and at leas of them is 1 or an integer greater than 1.

The surfactant may further include the compound represented by Chemical Formula 4.

The ink composition may have a viscosity of about 1.5 to about 20 cps.

The ink composition may have a dynamic surface tension of about 20 to about 40 dyne/cm at 0 Hz, and a difference between the dynamic surface tension at 0 Hz and that of at 15 Hz may be 0 to about 30 dyne/cm.

Exemplary embodiments of the present general inventive concept may also be achieved by providing a multi-color ink set that includes the ink composition described above, wherein the multi-color ink set includes at least two ink compositions having colors different from each other.

Exemplary embodiments of the present general inventive concept may also be achieved by providing a cartridge for inkjet recording, the cartridge includes the multi-color ink set described above.

Exemplary embodiments of the present general inventive concept may also be achieved by providing an inkjet recording apparatus having the cartridge for inkjet recording described above.

Exemplary embodiments of the present general inventive concept may also be achieved by providing a method of manufacturing an ink composition of inkjet recording, the method includes combining at least one surfactant containing benzophenone polyoxyethylene glycol-based compound as illustrated in Chemical Formula 1 below, a colorant, and a solvent.

<Chemical Formula 1>

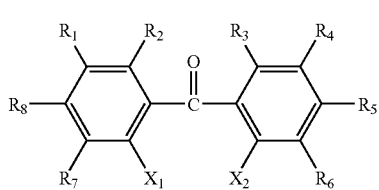

where $R_1$, $R_2$, $R_3$, $R_4$, $R_5$, $R_6$, $R_7$, and $R_8$ are each independently hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 heteroalkyl group, a substituted or unsubstituted C6-C30 aryl group, or a substituted or unsubstituted C4-C30 heteroaryl group, and $X_1$ and $X_2$ are each independently $(CH_2CH_2O)_nH$, $(CH(CH_3)CH_2)_nH$ or $(CH_2CH_2O)_{m1}(CH(CH_3)CH_2)_{m2}H$, n and m1+m2 are each independently an integer of 1 to 10, and m1 and m2 are each independently an integer of 1 to 9.

A content of benzophenon polyoxyethylene glycol-based compound may be about 0.1 to about 20 parts by weight, a content of the colorant is about 0.1 to about 15 parts by weight, and a content of the solvent is about 70 to about 90 parts by weight respectively based on 100 parts by weight of a total weight of the ink composition.

The surfactant may further include at least one compound selected from the group consisting of compounds represented by Chemical Formula 2 through 5 illustrated below in a content of about 0.1 to about 15 parts by weight based on 100 parts by weight of a total weight of the ink composition.

<Chemical Formula 2>

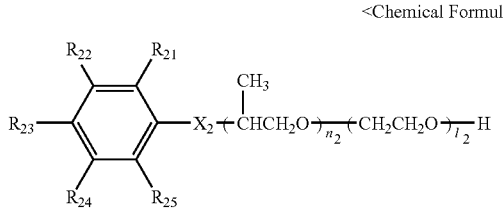

where $R_{21}$, $R_{22}$, $R_{23}$, $R_{24}$, and $R_{25}$ are each independently hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 hetero-alkyl group, a substituted or unsubstituted C6-C30 aryl group, or a substituted or unsubstituted C4-C30 hetero-aryl group, $X_2$ is a single bond, oxygen, sulphur, $NR_{26}$, a substituted or unsubstituted C1-C20 alkylene group, a substituted or unsubstituted C1-C20 hetero-alkylene group, a substituted or unsubstituted C6-C30 arylene group, a substituted or unsubstituted C4-C30 heteroarylene group, a substituted or unsubstituted C2-C20 alkenylene group, a substituted or unsubstituted C2-C20 hetero-alkenylene group, a substituted or unsubstituted C3-C30 cycloalkylene group, a substituted or unsubstituted C7-C30 aralkylene group, a carbonyl group, or an ester group, and $R_{26}$ is hydrogen, halogen, substituted or unsubstituted C1-C20 alkyl group, a substituted or unsubstituted C1-C20 alkoxy group, a substituted or unsubstituted C1-C20 heteroalkyl group, and $l_2$ and $n_2$ are each independently an integer of 0 to 100, and at least one of them is 1 or an integer greater than 1.

<Chemical Formula 3>

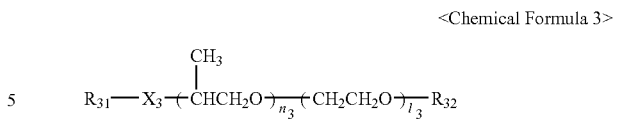

where $R_{31}$ and $R_{32}$ are each independently the same as $R_{21}$, $X_3$ is the same as $X_2$, and $l_3$ and $n_3$ are each independently an integer of 0 to 100, and at least one of them is 1 or an integer greater than 1.

<Chemical Formula 4>

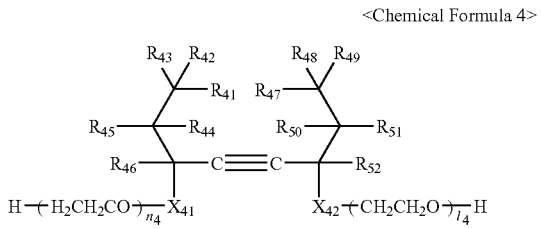

where $R_{41}$, $R_{42}$, $R_{43}$, $R_{44}$, $R_{45}$, $R_{46}$, $R_{47}$, $R_{48}$, $R_{49}$, $R_{50}$, $R_{51}$, and $R_{52}$ are each independently the same as $R_{21}$, $X_{41}$ and $X_{42}$ are each independently have definition the same as $X_2$, and $l_4$ and $n_4$ are each independently an integer of 0 to 100, and at least one of them is 1 or an integer greater than 1.

<Chemical Formula 5>

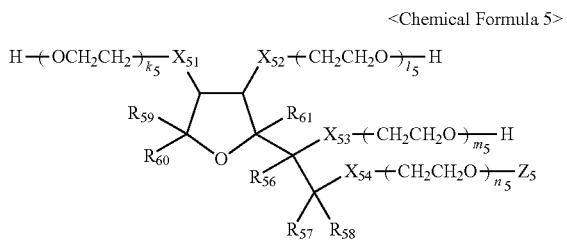

where $R_{56}$, $R_{57}$, $R_{58}$, $R_{59}$, $R_{60}$, and $R_{61}$ are each independently the same as $R_{21}$, $Z_5$ is the same as $R_{21}$, $X_{51}$, $X_{52}$, $X_{53}$ and $X_{54}$ are each independently the same as $X_2$, and $k_5$, $l_5$, $m_5$, and $n_5$ are each independently an integer of 0 to 100, and at least one of them is 1 or an integer greater than 1.

The surfactant may further include the compound of Chemical Formula 4.

The ink composition may have a viscosity of about 1.5 to about 20 cps.

The ink composition may have a dynamic surface tension of about 20 to about 40 dyne/cm at 0 Hz, and a dynamic surface tension difference between a dynamic surface tension at 15 Hz and that of at 0 Hz is 0 to about 30 dyne/cm.

The colorant may be a dye, a pigment, or a self-dispersing type pigment.

BRIEF DESCRIPTION OF THE DRAWINGS

The above and/or other features and utilities of the present general inventive concept will become more apparent by describing in detail exemplary embodiments thereof with reference to the attached drawings in which.

DETAILED DESCRIPTION OF THE EMBODIMENTS

Figure 1:
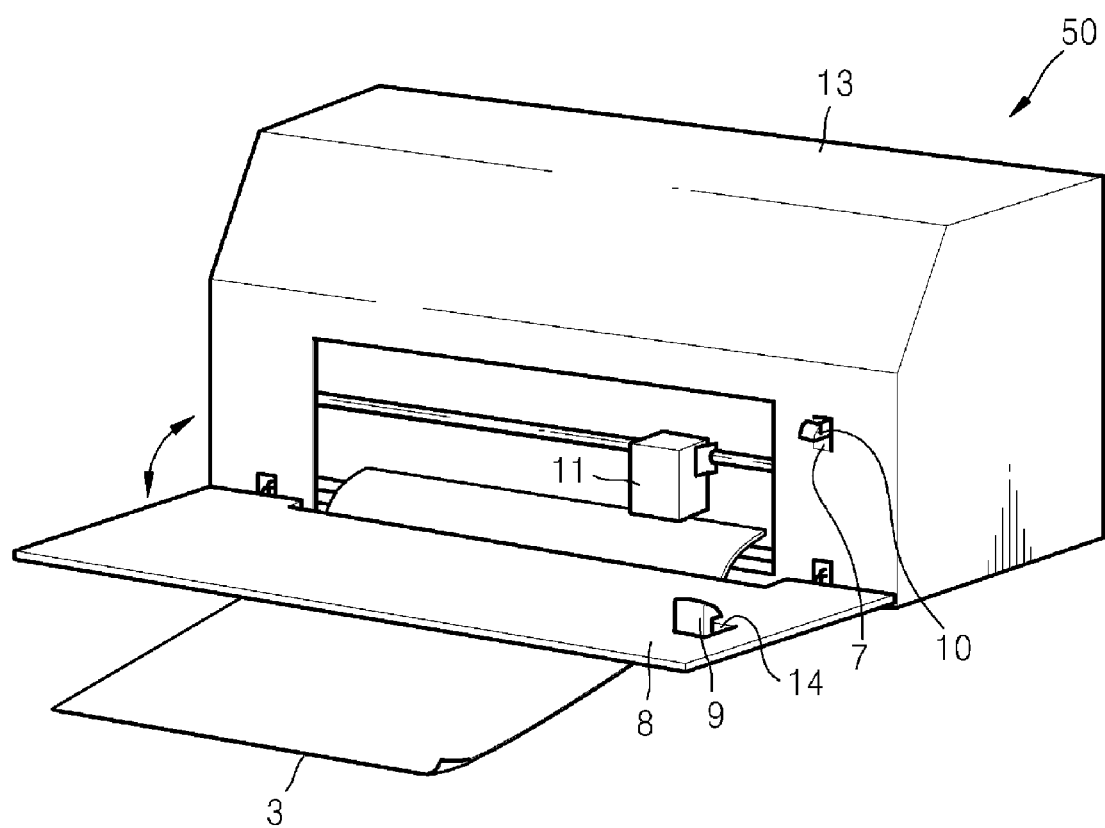
FIG. 1 is a perspective view of an inkjet recording apparatus having an ink cartridge containing an ink composition according to an exemplary embodiment of the present general inventive concept.

The present general inventive concept will now be described more fully with reference to the accompanying drawings, in which exemplary embodiments of the present general inventive concept are illustrated. Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures An ink composition of inkjet recording according to an exemplary embodiment of the present general inventive concept has an improved ink-refill balance characteristic, thereby improving a stability of ink droplet ejection and an image quality of an inkjet recording apparatus. The ink composition includes at least one surfactant including a benzophenone polyoxyethylene glycol-based compound of the following Chemical Formula 1, a colorant, and a solvent.

<Chemical Formula 1>

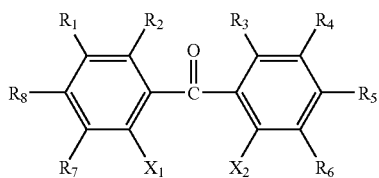

In Chemical Formula 1, $R_1$, $R_2$, $R_3$, $R_4$, $R_5$, $R_6$, $R_7$, and $R_8$ may each independently be hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 heteroalkyl group, a substituted or unsubstituted C6-C30 aryl group, or a substituted or unsubstituted C4-C30 heteroaryl group, and $X_1$ and $X_2$ are each independently $(CH_2CH_2O)_nH$, $(CH(CH_3)CH_2)_nH$ or $(CH_2CH_2O)_{m1}(CH(CH_3)CH_2)_{m2}H$, n and m1+m2 are respectively independently an integer of 1 to 10, and m1 and m2 are each independently an integer of 1 to 9.

The polyoxyethylene glycol-based compound may include a hydrophilic group and a hydrophobic group. Aryl-based moieties of the hydrophobic group structurally have compatibility with an aryl-based structure of a dye and a pigment structure, and the hydrophilic groups of the X1 and X2 have compatibility with water and a water-miscible organic solvent. Therefore, a difference between a highest dynamic surface tension value and a lowest dynamic surface tension value is small, and thus, the fluidity of the ink may be increased.

In alternative exemplary embodiments, the surfactant may further include at least one selected from compounds represented by Chemical Formulae 2 through 5, besides the compound of Chemical Formula 1.

<Chemical Formula 2>

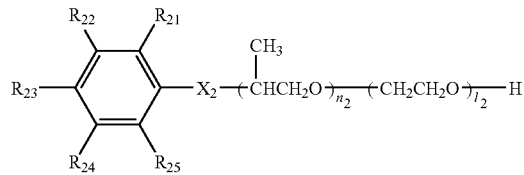

In Chemical Formula 2, $R_{21}$, $R_{22}$, $R_{23}$, $R_{24}$, and $R_{25}$ may each independently be hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 heteroalkyl group, a substituted or unsubstituted C6-C30 aryl group, or a substituted or unsubstituted C4-C30 heteroaryl group.

$X_2$ is a simple bond, oxygen, sulphur, $NR_{26}$, a substituted or unsubstituted C1-C20 alkylene group, a substituted or unsubstituted C1-C20 hetero-alkylene group, a substituted or unsubstituted C6-C30 arylene group, a substituted or unsubstituted C4-C30 heteroarylene group, a substituted or unsubstituted C2-C20 alkenylene group, a substituted or unsubstituted C2-C20 hetero-alkenylene group, a substituted or unsubstituted C3-C30 cycloalkylene group, a substituted or unsubstituted C7-C30 aralkylene group, a carbonyl group, or an ester group, and $R_{26}$ is hydrogen, halogen, substituted or unsubstituted C1-C20 alkyl group, a substituted or unsubstituted C1-C20 heteroalkyl group.

$I_2$ and $n_2$ may each independently be an integer of 0 to 100, and at least one of them is 1 or an integer greater than 1.

<Chemical Formula 3>

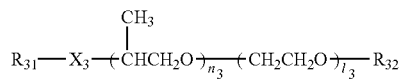

In Chemical Formula 3, $R_{31}$ and $R_{32}$ may each independently be the same as $R_{21}$, and $X_3$ is the same as $X_2$. $I_3$ and $n_3$ are each independently an integer of 0 to 100, and at least one of them is an integer greater than 1.

<Chemical Formula 4>

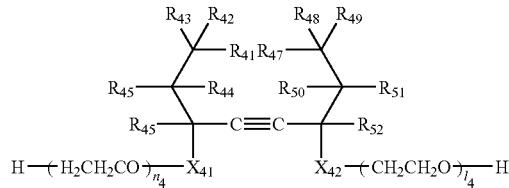

In Chemical Formula 4, $R_{41}$, $R_{42}$, $R_{43}$, $R_{44}$, $R_{45}$, $R_{46}$, $R_{47}$, $R_{48}$, $R_{49}$, $R_{50}$, $R_{51}$, and $R_{52}$ may each independently be the same as $R_{21}$, and $X_{41}$ and $X_{42}$ are each independently the same as $X_2$. $I_4$ and $n_4$ are each independently an integer of 0 to 100, and at least one of them is 1 or an integer greater than 1.

<Chemical Formula 5>

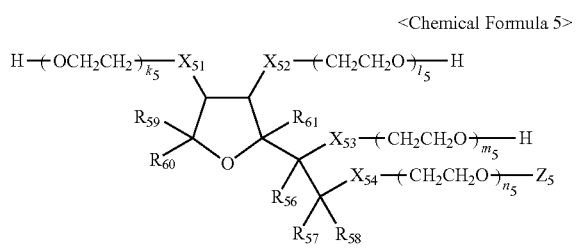

In Chemical Formula 5, $R_{56}$, $R_{57}$, $R_{58}$, $R_{59}$, $R_{60}$, and $R_{61}$ may each independently be the same as $R_{21}$, $Z_5$ is the same as $R_{21}$, and $X_{51}$, $X_{52}$, $X_{53}$ and $X_{54}$ are each independently the same as $X_2$. $k_5$, $l_5$, $m_5$, and $n_5$ are each independently an integer of 0 to 100, and at least one of is 1 or an integer greater than 1.

In alternative exemplary embodiments, the surfactant may further include a compound of Chemical Formula 4, besides the compound of Chemical Formula 1. More specifically, the surfactant of Chemical Formula 4 may be a compound of Chemical Formula 6.

<Chemical Formula 6>

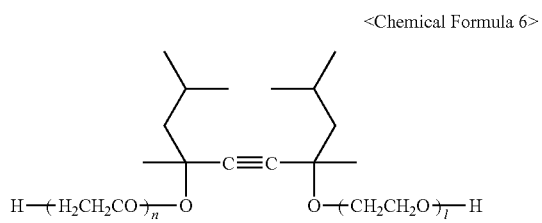

In Chemical Formula 6, n and l are each an integer of 1 to 30, and the sum of n+l is an integer of 2 to 50.

In exemplary embodiments, each substituent used in the definition described above may be defined as follows.

The "alkyl group" refers to a linear or branched monovalent saturated hydrocarbon moiety having carbon atoms of 1 to 20, specifically, 1 to 10, and more specifically, 1 to 6. At least one hydrogen atom included in the alkyl group may be substituted by a halogen atom; a hydroxy group; a —SH, a nitro group; a cyano group; a substituted or unsubstituted amino group, such as —NH$_2$, —NH(R), or —N(R')(R") where R, R' and R" are each independently a C1-C10 alkyl group; an amidino group; a —NHNH$_2$, a hydrazone group; a carboxylic group; a sulfonic acid group; and a phosphoric acid group. Exemplary embodiments of the alkyl group include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, and bromomethyl. However, the present general inventive concept is not limited thereto.

The "alkoxy group" refers to a linear or branched monovalent ether type oxygen-containing saturated hydrocarbon moiety having carbon atoms of 1 to 20, specifically, 1 to 10, and more specifically, 1 to 6. Exemplary embodiments of the alkoxy group include methoxy, ethoxy, propoxy, and butoxy such as t-butoxy. However, the present general inventive concept is not limited thereto. The alkoxy group may provide a haloalkoxy group by being further substituted by at least one halogen atom such as fluoro, chloro, or bromo. Exemplary embodiments of the haloalkoxy group include fluoromethoxy, chloromethoxy, trifluoromethoxy, fluoroethoxy, and fluoropropoxy. However, the present general inventive concept is not limited thereto. That is, in an exemplary embodiment, at least one hydrogen atom of the alkoxy group may be substituted by the same substituent as in the case of the alkyl group.

The "aryl group" refers to a monovalent monocyclic or a polycyclic aromatic hydrocarbon moiety having carbon atoms of 6 to 30, specifically, 6 to 18, and more specifically, 6 to 12. The aromatic moiety of the aryl group includes only carbon atoms. Exemplary embodiments of the aryl group include phenyl, tolyl, naphtyl, naphtacenyl, xylyl, biphenyl, anthryl, phenanthrenyl, anthracenyl, indenyl, and fluorenyl. At least one hydrogen atom of the aryl group may be selectively substituted by an alkyl group having carbon atoms of 1 to 10, in particular, 1 to 6, a halogen atom, a hydroxyl group, a —SH, a nitro group, a cyano group, a substituted or unsubstituted amono group, an amidino group, a —NHNH$_2$, a hydrazone group; a carboxylic group; a sulfonic acid group; or a phosphoric acid group. However, the present general inventive concept is not limited thereto.

The "aralkyl group" refers to a monovalent hydrocarbon moiety having carbon atoms of 7 to 30, specifically, 7 to 18, and more specifically, 7 to 13 in which at least one hydrogen atom of the alkyl group defined above in substituted with an aryl group. At least one hydrogen atom in the aralkyl group may be optionally atom by a halogen substituent. Specific examples of the aralkyl group include benzyl group and methylene naphtyl group. However, the present general inventive concept is not limited thereto.

The "heteroalkyl group" or "heteroaryl group" may each be formed by substituting a portion of carbon atoms of a chain that constitutes the alkyl group or the aryl group defined above by hetero atoms such as nitrogen atom, sulphur atom, phosphor atom, or oxygen atom. The heteroaryl group may have carbon atoms of 4 to 18, more specifically, 4 to 12, and may include a fused ring. At least one hydrogen atom in the heteroalkyl group or heteroaryl group may be selectively substituted by an alkyl group; a halogen atom; a hydroxy group; a —SH, a nitro group; a cyano group; a substituted or unsubstituted amino group; an amidino group; a —NHNH$_2$, a hydrazone group; a carboxylic group; a sulfonic acid group; or a phosphoric acid group. Exemplary embodiments of the heteroaryl group include pyridyl, imidazolyl, carbazolyl, quinolyl, and indolyl. However, the present general inventive concept is not limited thereto.

The "alkylene group" refers to a linear or branched divalent saturated hydrocarbon moiety having carbon atoms of 1 to 20, specifically, 1 to 10, and more specifically, 1 to 6. At least one hydrogen atom in the alkylene group may be selectively substituted by an alkyl group; a halogen atom; a hydroxy group; a —SH, a nitro group; a cyano group; a substituted or unsubstituted amino group; an amidino group; a —NHNH$_2$, a hydrazone group; a carboxylic group; a sulfonic acid group; or a phosphoric acid group. Exemplary embodiments of the alkylene may include methylene, ethylene, propylene, n-butylene, and hexylene. However, the present general inventive concept is not limited thereto.

The "arylene group" refers to a divalent monocyclic, bicyclic, or tricyclic aromatic hydrocarbon moiety having carbon atoms of 6 to 30, specifically, 6 to 18, and more specifically, 6 to 12. At least one hydrogen atom in the arylene group may be selectively substituted by an alkyl group; a halogen atom; a hydroxy group; a —SH, a nitro group; a cyano group; a substituted or unsubstituted amino group; an amidino group; a —NHNH$_2$, a hydrazone group; a carboxylic group; a sulfonic acid group; or a phosphoric acid group. Exemplary embodiments of the arylene group may include phenylene, naphthalenylene, and biphenylene. However, the present general inventive concept is not limited thereto.

The "alkenylene group" refers to a linear or branched divalent hydrocarbon portion including at least one C—C double bond having carbon atoms of 2 to 20, specifically, 2 to 10, and more specifically, 2 to 6. The alkenylene group may be bonded to other moiety through carbon atoms that include the C—C double bond and/or saturated carbon atoms. The alkenylene group may be optionally substituted by at least one halogen substituent. Exemplary embodiments of the alkenylene group include —CH=CH—, —CH$_2$CH=CH—, —CH=C(CH$_3$)—, and —CH$_2$CH=CHCH$_2$—. However, the present general inventive concept is not limited thereto.

The "cycloalkylene group" refers to a saturated or unsaturated non-aromatic divalent monocyclic, bicyclic, or tricyclic hydrocarbon moiety having carbon atoms of 3 to 30, specifically, 3 to 10, and more specifically, 3 to 6. The cycloalkylene group may be optionally substituted by at least one halogen substituent. Exemplary embodiments of the cycloalkylene group include cyclopropylene, cyclobutylene, and cyclopentylene. However, the present general inventive concept is not limited thereto.

The "aralkylene group" refers to a divalent hydrocarbon moiety having carbon atoms of 7 to 30, specifically, 7 to 18, and more specifically, 7 to 13, which may be formed by substituting at least one hydrogen atom in the alkylene group by an aryl group. The aralkylene group may be optionally substituted by at least one halogen substituent. Examples of the aralkylene group include benzylene and methylenenaphthalenylene. However, the present general inventive concept is not limited thereto.

The "heteroalkylene group", "heteroarylene group", and "heteroalkenylene group" are each formed by substituting a portion of carbon atoms of a chain that constitutes the alkylene group, the arylene group, and the alkenylene group defined above by a hetero atom such as a nitrogen atom, a sulphur atom, a phosphor atom, and an oxygen atom. The heteroarylene group can have carbon atoms of 4 to 30, specifically, 4 to 18, and more specifically, 4 to 12. At least one hydrogen atom of the heteroalkylene group or the heteroalkenylene group may be selectively substituted by an alkyl group; a halogen atom; a hydroxy group; a —SH, a nitro group; a cyano group; a substituted or unsubstituted amino group; an amidino group; a —NHNH$_2$, a hydrazone group; a carboxylic group; a sulfonic acid group; or a phosphoric acid group. A "simple bond means a single bond. However, the present general inventive concept is not limited thereto.

In view of ink fluidity improvement and ink-refill balance, the ink composition of inkjet recording has a dynamic surface tension of about 20 to about 40 dyne/cm, and more specifically, about 30 to about 35 dyne/cm at frequency of 0 Hz. If the dynamic surface tension of the ink composition of inkjet recording is less than about 20 dyne/cm, the ink fluidity is reduced, and thus, a stable image quality is difficult to obtain. If the dynamic surface tension exceeds about 40 dyne/cm, the ink fluidity may be improved, however, the characteristic of an initial ink droplet ejection may be deteriorated. In view of ink fluidity improvement and ink-refill balance, the difference between the dynamic surface tension at 15 Hz and at 0 Hz may be 0 to about 30 dyne/cm, and more specifically, about 5 to about 20 dyne/cm. If the dynamic surface tension difference exceeds about 30 dyne/cm, a variation of dynamic surface tension according to a variation of ejection atmosphere is large, and thus, a fluctuation of ink-refill balance may occur. In this case, if the printing operation is consecutively performed for a long period of time, uniform ink droplet ejection and image quality may not be maintained.

In exemplary embodiments, the viscosity of the ink composition for optimal use may be about 1.5 to about 20 cps, and specifically, about 1.5 to about 3.5 at 20° C.

In order to achieve the characteristics as described in the above ink composition, the content of the polyoxyethyleneglycol-based compound represented by Chemical Formula 1 may be about 0.1 to about 20 part by weight, and specifically, about 1 to about 10 parts by weight, the content of colorant may be about 0.1 to about 15 parts by weight, and the content of the solvent may be about 70 to about 90 parts by weight based on 100 parts by weight of the ink composition. If the content of the polyoxyethyleneglycol-based compound is less than 0.1 parts by weight, the fluidity of ink composition may not be improved, and if the content of the polyoxyethyleneglycol-based compound exceeds 20 parts by weight, the solubility of the ink composition may be reduced and surfaces of the nozzles may be damaged. In a similar point of view, the content of at least one compound selected from the compounds represented by Chemical Formulae 2 through 5 may be about 0.1 to about 15 parts by weight, and specifically, about 0.5 to about 7.5 parts by weight based on 100 parts by weight of the ink composition.

As described above, the ink composition may include at least two surfactants in order to achieve the characteristics as described above and to secure a dispersion stability of the colorant. In this case, at least one of the surfactants may have a hydrophilic-lipophilic balance (HLB) value of 12 or larger and at least one of the surfactants may have a HLB value less than 12. More specifically, at least one of the surfactants may have a strong hydrophilic property having a HLB value of about 12 to about 20, and at least one of the surfactants may have a weak hydrophilic property having a HLB value between 4 and 12. The HLB value was initially introduced by a research group of Atlas Powder Co., USA, and indicates the "balance" between the hydrophilic portion and the lipophilic portion in a molecule of a surfactant. The HLB value varies according to a molecular structure, and is very useful in selecting surfactants.

The colorant for the ink composition may be a dye, a pigment, or a self-dispersing pigment that may be used in the art, however, the present general inventive concept is not limited thereto. That is, the colorant may be a dye that may be dissolved or dispersed in water, a pigment that may be stably dispersed in water with the aid of a dispersing agent, a self-dispersing pigment that may be stably dispersed without the need of a dispersing agent, and/or a mixture of these materials.

In exemplary embodiments, the dye may include Food Black dyes, Food Red dyes, Food Yellow dyes, Food Blue dyes, Acid Black dyes, Acid Red dyes, Acid Blue dyes, Acid Yellow dyes, Direct Black dyes, Direct Blue dyes, Direct Yellow dyes, anthraquinone dyes, monoazo dyes, disazo dyes, and phthalocyanine derivatives, etc. Specific examples of the pigment may include carbon black, graphite, vitreous carbon, activated charcoal, activated carbon, anthraquinone, phthalocyanine blue, phthalocyanine green, diazos, monoazo, pyranthrone, perylene, quinacridone, and indigoid pigments. The specific examples of the self-dispersing pigment may include cabojet-series or CW-series of Orient Chemical Industries, Ltd., however, the present general inventive concept is not limited thereto.

The content of the colorant may be about 0.1 to about 15 parts by weight, and specifically, about 1 to about 10 parts by weight based on 100 parts by weight of the ink composition. If the content of the colorant is less than 0.1 parts by weight, a sufficient color display may not be achieved, and if the content of the colorant exceeds about 15 parts by weight, the ink composition may be uneconomical to manufacture.

A solvent included in the ink composition may be water, a water miscible organic solvent, or a mixture of these solvents. The content of the solvent may be about 70 to about 90 parts by weight based on 100 parts by weight of the ink composition. If the content of the solvent is less than 70 parts by weight, the viscosity of the ink composition may be excessively increased resulting in reduced ejection performance of the ink, and if the content of the solvent exceeds 90 parts by weight, the viscosity of the ink composition is excessively reduced.

The water-miscible organic solvent may be at least one selected from the group consisting of a monohydric alcohol solvent, a ketone solvent, an ester solvent, a polyhydric alcohol solvent, a derivative of polyhydric alcohol solvent, a nitrogen-containing solvent, a sulfur-containing compound, a dimethylsulfoxide, tetramethylsulfone, and of thioglycol. However, the present general inventive concept is not limited thereto.

The monohydric alcohol solvent controls a surface tension of the ink, and thus, can enhance a penetrability, a dot forming ability, and a drying property of a printed image on a recording medium, such as a normal sheet of paper or a professional sheet of paper. The polyhydric alcohol solvent and its derivative solvents do not easily evaporate and decreases a freezing point of the ink, and as a result, a storage stability of the ink may be increased, thereby preventing plugging of the nozzles.

In exemplary embodiments, the monohydric alcohol solvent includes methyl alcohol, ethyl alcohol, n-propyl alcohol, i-propyl alcohol, n-butyl alcohol, s-butyl alcohol, and t-butyl alcohol, and in particular, ethyl alcohol, i-propyl alcohol, and n-butyl alcohol. Specific examples of the polyhydric alcohol solvent include: alkylene glycols such as ethylene glycol, diethylene glycol, triethylene glycol, propylene glycol, butylene glycol, and glycerol; polyalkylene glycols such as polyethylene glycol and polypropylene glycol; and thiodigylcols. The examples of the derivatives of the polyhydric alcohol include: lower alkylether of the polyhydric alcohol described above, such as ethylene glycol dimethyl ether; and a lower carboxylic acid ester of the polyhydric alcohol described above, such as ethylene glycol diacetate. The ketone solvent may include acetone, methyl ethyl ketone, diethyl ketone, and diacetone alcohol. Specific examples of the ester solvent include methyl acetate, ethyl acetate, and ethyl lactate. However, the present general inventive concept is not limited thereto.

In exemplary embodiments, the nitrogen-containing solvent as a water miscible organic solvent includes 2 pyrrolidone or N-methyl-2-pyrrolidone, and sulphur-containing solvent include dimethyl sulfoxide, tetramethylene sulfone, and thioglycol. However, the present general inventive concept is not limited thereto.

If the above solvent is a mixture of these solvents, the solvent mixture may include a water miscible organic solvent in a ratio of about 0.1 to about 130 parts by weight based on 100 parts by weight of the water. If the ratio of the water miscible organic solvent is less than about 0.1 parts by weight, the surface tension of ink may increase too much, and if the ratio exceeds 130 parts by weight, the viscosity of ink may be increased, thereby reducing an ejection performance of the nozzles.

The ink composition may further include various additives. Specifically, the ink composition may further include at least one additive selected from the group consisting of a wetting agent, a dispersing agent, other surfactant, a viscosity control agent, a pH controlling agent, or an anti-oxidant. The content of the additive may be about 0.1 to about 20 parts by weight, specifically, about 0.1 to about 10 parts by weight based on 100 parts by weight of ink composition. However, the present general inventive concept is not limited thereto.

According to an exemplary embodiment of the present general inventive concept, there is provided a multi-color ink set that includes an ink composition of inkjet recording, wherein the multi-color ink set includes at least two ink compositions having different colors from each other. The ink set may be provided to an ink accommodating unit of an inkjet recording apparatus or in an inkjet printer cartridge. That is, the cartridge of the inkjet recording apparatus according to another exemplary embodiment of the present general inventive concept includes a multi-color ink set as described above. The inkjet recording apparatus according to another exemplary embodiment of the present general inventive concept includes the cartridge of the inkjet recording apparatus. A thermal type inkjet recording apparatus includes a thermal printhead that ejects ink droplets by heating the ink composition in order to generate bubbles. A piezo type inkjet recording apparatus includes a piezo printhead that ejects ink droplets by generating a pressure pulse by using a piezo device. The inkjet recording apparatus may be a scanning type printer or an array type printer. The array type printer may include a plurality of nozzles, and more specifically, more than 10,000 nozzles. The inkjet recording apparatus may be used in printing on paper, textiles, or other materials for industrial purposes. The inkjet recording apparatuses in which the ink composition according to an exemplary embodiment of the present general inventive concept may be used, but are not limited to the inkjet recording apparatuses as described above and may also be used for various other purposes.

FIG. 1 is a schematic perspective view of an inkjet recording apparatus 50 having an ink cartridge containing an ink composition according to an exemplary embodiment of the present general inventive concept.

Referring to FIG. 1, the inkjet recording apparatus 50 includes an inkjet printer cartridge 11 that contains the ink composition as described above. A printer cover 8 is connected to a main body 13 of the inkjet recording apparatus 50. An engaged region of a movable latch 10 protrudes through a hole 7. The movable latch 10 is designed to engage with a fixed latch 9 on the printer cover 8, and the fixed latch 9 contacts the movable latch 10 on an inner side of the printer cover 8 when the printer cover 8 is closed. The printer cover 8 has a recess 14 which corresponds to an engaged portion of the movable latch 10 that extends through the hole 7. The inkjet printer cartridge 11 is mounted within the inkjet recording apparatus 50 so that ink may be disposed on a sheet of paper 3 passing under the inkjet printer cartridge 11.

Figure 2:
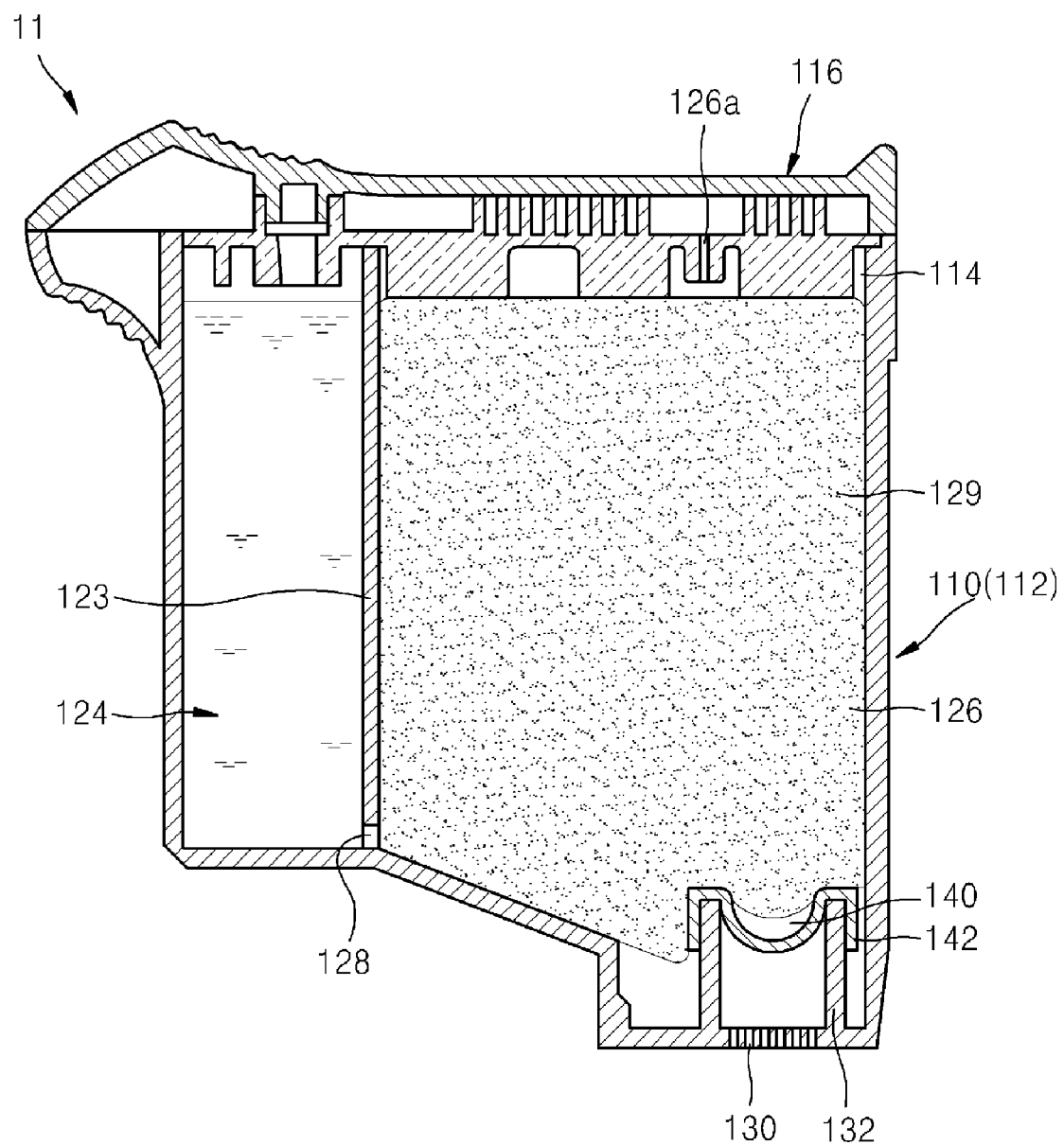
FIG. 2 is a cross-sectional view of an inkjet printer cartridge containing an ink composition according to an exemplary embodiment of the present general inventive concept.

FIG. 2 is a cross-sectional schematic view of the inkjet printer cartridge 11 that includes an ink composition set according to an exemplary embodiment of the present general inventive concept. The inkjet printer cartridge 11 includes an ink cartridge main body 110 that forms an ink tank 112, an inner cover 114 that covers a top region of the ink tank 112, and an external cover 116 that is separated by a predetermined distance from the inner cover 114 to seal the ink tank 112 and the inner cover 114.

The ink tank 112 is divided into a first ink chamber 124 and a second ink chamber 126 by a vertical barrier wall 123. An ink passage 128 is formed on the lowest part of the vertical barrier wall 123 between the first and second ink chambers 124 and 126. Ink fills the first ink chamber 124 and a sponge 129, and then fills the second ink chamber 126. A vent hole 126a corresponding to the second ink chamber 126 is formed on the inner cover 114. In exemplary embodiments, the vent hole 126a may be formed thru the inner cover 114.

A filter 140 is formed on a lower portion of the second chamber 126 to filter impurities and minute bubbles in ink so as to prevent ejection holes of a printhead 130 from clogging with the impurities and the minute bubbles. A hook 142 is formed on an edge of the filter 140 and is located on a top region of a standpipe 132. Ink in the ink tank 112 is ejected as tiny droplets onto a printing medium through ejection holes of the printhead 130.

In exemplary embodiments, the present general inventive concept also provides a method of manufacturing the above described ink composition. In an exemplary embodiment, the method of manufacturing the ink composition includes combining at least one surfactant containing benzophenone polyoxyethylene glycol-based compound as illustrated in Chemical Formula 1 below with a colorant and a solvent, as described above.

<Chemical Formula 1>

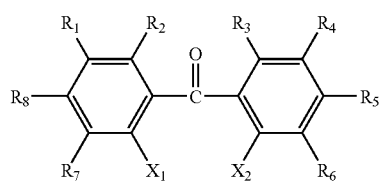

where $R_1$, $R_2$, $R_3$, $R_4$, $R_5$, $R_6$, $R_7$, and $R_8$ are each independently hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 heteroalkyl group, a substituted or unsubstituted C6-C30 aryl group, or a substituted or unsubstituted C4-C30 heteroaryl group, and $X_1$ and $X_2$ are each independently $(CH_2CH_2O)_nH$, $(CH(CH_3)CH_2)_nH$ or $(CH_2CH_2O)_{m1}(CH(CH_3)CH_2)_{m2}H$, n and m1+m2 are each independently an integer of 1 to 10, and m1 and m2 are each independently an integer of 1 to 9.

The exemplary embodiment of the present general inventive concept will now be described in more detail with reference to the following examples. However, these examples are only for illustrative purposes and are not intended to limit the scope of the present general inventive concept.

EXAMPLES

Manufacture of Ink Composition

Ink compositions for inkjet recording according to the examples 1 through 4 were manufactured by completely mixing components illustrated in the following examples 1 through 4 using a mixer. Product NN207 is a non-ionic surfactant manufactured by Hannong Chemical Co. Ltd., Korea, which corresponds to a compound represented by chemical Formula 1 in which $R_1=R_4=R_5=R_6=R_7=R_8$ are hydrogen atoms, $R_2=R_3$ are n-nonyl groups, both $X_1$ and $X_2$ are $(CH_2CH_2O)nH$, and n indicating the sum of ethylene oxide (EO) residues in $X_1$ and $X_2$ is 7. NN205 is a non-ionic surfactant manufactured by Hannong Chemical Co. Ltd., Korea, which corresponds to a compound represented by Chemical Formula 1 in which $R_1=R_4=R_5=R_6=R_7=R_8$ are hydrogen atoms, $R_2=R_3$ are n-nonyl groups, both $X_1$ and $X_2$ are $(CH_2CH_2O)nH$, and n indicating the sum of EO residues in $X_1$ and $X_2$ is 5. Surfynol 465 is a non-ionic surfactant manufactured by Airproduct Co, which corresponds to a compound represented by Chemical Formula 6, in which n+I=10. Tergitol 15-S-7 is a secondary alcohol ethoxylate-based non-ionic surfactant produced by Dow Chemical Company. Zonyl FSO is a non-ionic fluorocarbon-based surfactant produced by Du Pont.

Example 1

| | |
|---|---|
| C.I. Basic Black 2 | 4.5 weight % |
| glycerol | 5.0 weight % |
| ethylene glycol | 5.0 weight % |
| diethylene glycol | 5.0 weight % |
| 2-pyrrolidone | 2.5 weight % |
| Surfynol 465 | 0.1 weight % |
| NN207 | 1.0 weight % |
| water | 76.9 weight % |

Example 2

| | |
|---|---|
| C.I. Basic Black 2 | 4.5 weight % |
| glycerol | 5.0 weight % |
| ethylene glycol | 5.0 weight % |
| diethylene glycol | 5.0 weight % |
| 2-pyrrolidone | 2.5 weight % |
| NN207 | 1.0 weight % |
| water | 77.0 weight % |

Example 3

| | |
|---|---|
| C.I. Pigment Yellow 93 | 4.5 weight % |
| glycerol | 5.0 weight % |
| ethylene glycol | 5.0 weight % |
| diethylene glycol | 5.0 weight % |
| 2-pyrrolidone | 2.5 weight % |
| NN205 | 1.0 weight % |
| water | 77.0 weight % |

Example 4

| | |
|---|---|
| C.I. Pigment Yellow 93 | 4.5 weight % |
| glycerol | 5.0 weight % |
| ethylene glycol | 5.0 weight % |
| diethylene glycol | 5.0 weight % |
| 2-pyrrolidone | 2.5 weight % |
| Surfynol 465 | 0.1 weight % |
| NN205 | 1.0 weight % |
| water | 77.0 weight % |

Comparative Example 1

| | |
|---|---|
| C.I. Basic Black 2 | 4.5 weight % |
| glycerol | 5.0 weight % |

-continued

| | |
|---|---|
| ethylene glycol | 5.0 weight % |
| diethylene glycol | 5.0 weight % |
| 2-pyrrolidone | 2.5 weight % |
| Zonyl FSO | 0.1 weight % |
| Tergitol 15-S-7 | 1.0 weight % |
| water | 76.9 weight % |

Comparative Example 2

| | |
|---|---|
| C.I. Basic Black 2 | 4.5 weight % |
| glycerol | 5.0 weight % |
| ethylene glycol | 5.0 weight % |
| diethylene glycol | 5.0 weight % |
| 2-pyrrolidone | 2.5 weight % |
| Tergitol 15-S-7 | 1.0 weight % |
| water | 77.0 weight % |

Comparative Example 3

| | |
|---|---|
| C.I. Pigment Yellow 93 | 4.5 weight % |
| glycerol | 5.0 weight % |
| ethylene glycol | 5.0 weight % |
| diethylene glycol | 5.0 weight % |
| 2-pyrrolidone | 2.5 weight % |
| Zonyl FSO | 0.1 weight % |
| Tergitol 15-S-7 | 1.0 weight % |
| water | 76.9 weight % |

Comparative Example 4

| | |
|---|---|
| C.I. Pigment Yellow 93 | 4.5 weight % |
| glycerol | 5.0 weight % |
| ethylene glycol | 5.0 weight % |
| diethylene glycol | 5.0 weight % |
| 2-pyrrolidone | 2.5 weight % |
| Tergitol 15-S-7 | 1.0 weight % |
| water | 77.0 weight % |

Test 1: Dynamic Surface Tension Measurement

Dynamic surface tensions of each of the ink compositions obtained according to the Examples 1 through 4 and the Comparative examples 1 through 4 using a Bubble Pressure Tensiometer BP2 (a product of Kruss Co.) are at room temperature.

Figure 3:
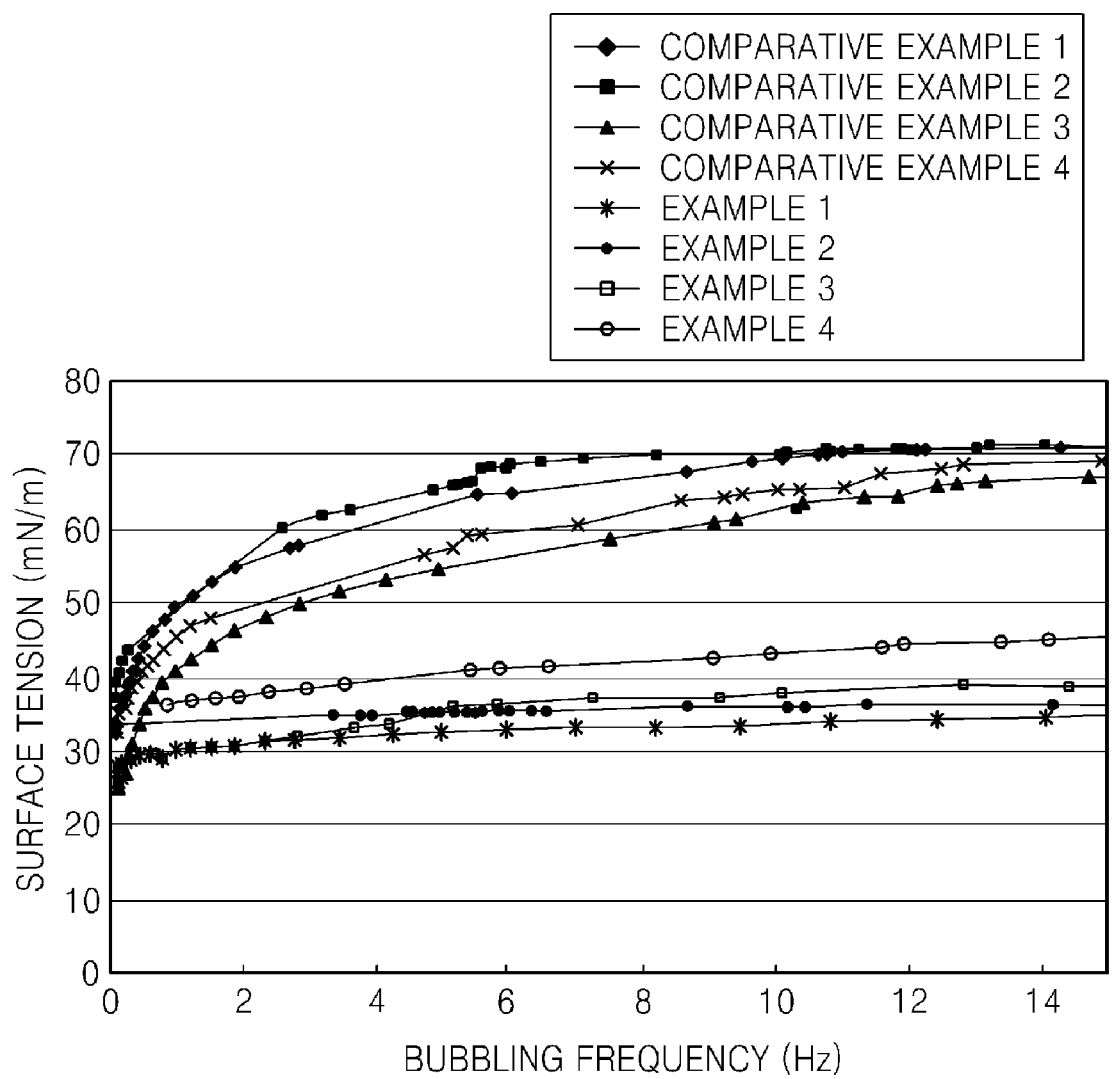
FIG. 3 is a graph illustrating measurement results of dynamic surface tension of ink compositions according to examples of the present general inventive concept and comparative examples

FIG. 3 is a graph illustrating measurement results of dynamic surface tensions of ink compositions according to the examples of the present general inventive concept and comparative examples. Table 1 summarizes the test results numerically. Referring to Table 1, the dynamic surface tension at bubbling frequency of 0 Hz, the dynamic surface tension at bubbling frequency of 15 Hz, and the difference between the two dynamic surface tensions are illustrated. According to exemplary embodiments of the present general inventive concept, the dynamic surface tension value at a bubbling frequency of 0 Hz indicates a dynamic surface tension value obtained by extrapolating to 0 Hz after measuring dynamic surface tensions at least two points in a low frequency range of 0.1 Hz to 1 Hz.

TABLE 1

| | Dynamic surface tension value at 0 Hz (A) (mN/m) | Dynamic surface tension value at bubbling frequency of 15 Hz (B) (mN/m) | $B - A = \Delta$ (mN/m) |
|---|---|---|---|
| Example 1 | 28.29 | 35.10 | 6.81 |
| Example 2 | 33.40 | 38.3 | 4.90 |
| Example 3 | 27.53 | 38.69 | 11.16 |
| Example 4 | 36.3 | 45.8 | 9.5 |
| Comparative Example 1 | 32.4 | 71.2 | 38.8 |
| Comparative Example 2 | 37.0 | 71.4 | 34.4 |
| Comparative Example 3 | 24.8 | 67.4 | 42.6 |
| Comparative Example 4 | 32.6 | 70.0 | 37.4 |

Referring to Table 1 and FIG. 3, since the ink compositions according to examples 1 through 4 of the present general inventive concept have reasonable dynamic surface tension values at 0 Hz, the ink compositions have high ink fluidity and high initial ink droplet ejection characteristics. The ink compositions according to examples 1 through 4 illustrate dynamic surface tension value differences at 15 Hz and 0 Hz much smaller than the ink compositions according to the comparative examples 1 through 4 respectively corresponding to examples 1 through 4. Thus, the ink compositions according to examples 1 through 4 have a small dynamic surface tension variation in a frequency range of 0 to 15 Hz, and thus, have a high and stable ink-refill balance. Therefore, even though a printing operation is consecutively performed for a long period of time, the ink compositions according to examples 1 through 4 can maintain uniform ink droplet ejection characteristics and image uniformity.

Test 2: Missing Nozzle Test

The same amount of each of the ink compositions according to the examples 1 through 4 and the comparative examples 1 through 4 and distilled water were tested in an inkjet printer (MJC-2400C, Samsung Electronic Co.) having a blade function. The test was performed after coating ink on surfaces of nozzles and drying the nozzles for 2 days. The degree of nozzle-cleaning was measured by counting nozzles that do not eject ink using a missing nozzle detecting pattern. The total number of nozzles were 760. The number of missing nozzles and the degree of ink remaining on the nozzles were evaluated using the following standard, and the results are summarized in Table 2.

Evaluation standard: A indicates the number of missing nozzles.

⊚: A<10
○: 10≦A<50
□: 50≦A<100
X: 100<A

Test 3: Nozzle Clogging Test

A same amount of each of the ink compositions according to examples 1 through 4 and the comparative examples 1 through 4 and distilled water were tested in an inkjet printer (MJC-2400C, Samsung electronic Co. Ltd.) having a blade function. Inks were filled in a cartridge ((M-50, Samsung electronic Co. Ltd.) and were kept for one week in an uncapped state. The cartridge was maintenanced using a wet blade function, and afterwards, the test was performed by using a 25% solid pattern.

The cartridge kept for one week was mounted on an inkjet printer, and afterwards, clogging was tested using the 25% solid pattern. When an image was normally printed without any missing dots prior to completing the printing of 100 dots, it was evaluated as "A". When an image was normally printed without any missing dots prior to completing the printing of a piece of A4 paper, it was evaluated as "B," and when at least one missing dot was found prior to completing the printing of a piece of A4 paper, it was evaluated as "C." The results are summarized in Table 2.

Test 4: EO Gap Measuring Test

The ink compositions according to the examples 1 through 4 and the comparative examples 1 through 4 were tested in an inkjet printer (MJC-2400C, Samsung Electronic Co.) to measure nozzle gaps between even and odd chips using an E-O gap measuring pattern. A nozzle gap when all nozzles normally eject ink is 10.00, and a degree of deviation from 10.00 was evaluated. The results are summarized in Table 2.

Evaluation standard: A indicates a nozzle gap between even and odd chips.

TABLE 2

|  | Number of missing nozzles (total 760) | Nozzle clogging test | EO gap measuring test | X-Y alignment measuring test |
|---|---|---|---|---|
| Example 1 | ◎ | A | ◎ | ◎ |
| Example 2 | ◎ | A | ◎ | ◎ |
| Example 3 | ◎ | A | ◎ | ◎ |
| Example 4 | ◎ | A | ◎ | ◎ |
| Comparative example 1 | ○ | B | ○ | ○ |
| Comparative example 2 | ○ | C | ○ | D |
| Comparative example 3 | ○ | C | D | D |
| Comparative example 4 | ○ | B | X | X |

◎: $9.90 < A \leq 10.10$
○: $9.80 < A \leq 9.90, 10.10 \leq A < 10.20$
D: $9.70 < A \leq 9.80, 10.20 \leq A < 10.30$
X: $A \leq 9.70, 10.30 \leq A$ Referring to Table 2, in the case of the ink compositions according to the examples 1 through 4 of the present general inventive concept, a nozzle missing phenomenon and nozzle clogging phenomenon were rarely observed. Also, the ink compositions according to the examples 1 through 4 illustrated good measurement results of EO gap and X-Y alignment, which are methods of evaluating images. In the case of the ink compositions according to the comparative examples 1 through 4, a few cases of missing nozzles and considerable cases of nozzle cloggings were observed. The measurement results of EO gap and X-Y alignment, which are methods of evaluating images, illustrated deviations from the standard values, and thus, an image failure was observed.

From the above results, it is seen that an ink composition that includes at least one surfactant containing benzophenone polyoxyethylene glycol-based compound of Chemical Formula 1, a colorant agent, and a solvent illustrates an excellent ink-refill balance, and has improved ink fluidity and ejection characteristics, and thus, can achieve a stable and high quality image, even though the ink is ejected for a long period of time.

According to another exemplary embodiment of the present general inventive concept, an ink composition of inkjet recording that includes the benzophenon polyoxyethylene glycol-based compound has high ink fluidity. Thus, when the ink composition is used in inkjet recording, the ink-refill balance can be improved.

According to another exemplary embodiment of the present general inventive concept, an ink composition of inkjet recording that includes the benzophenon polyoxyethylene glycol-based compound may uniformly maintain the ejection of ink droplets from an inkjet printhead for a long period of time. Thus, even though images are consecutively printed with the ink composition using an inkjet printing method, the uniformity of image quality at a high level can be maintained.

While the present general inventive concept has been particularly illustrated and described with reference to a few exemplary embodiments thereof, it will be understood by those of ordinary skill in the art that various changes in form and details may be made therein without departing from the spirit and scope of the present general inventive concept as defined by the following claims and their equivalents.

What is claimed is:

1. An ink composition of inkjet recording, the ink composition comprising:
   at least one surfactant containing benzophenone polyoxyethylene glycol-based compound as illustrated in Chemical Formula 1 below;
   a colorant; and
   a solvent, <Chemical Formula 1>

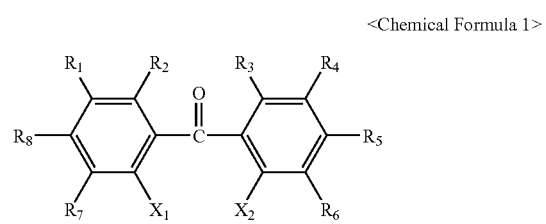

where $R_1$, $R_2$, $R_3$, $R_4$, $R_5$, $R_6$, $R_7$, and $R_8$ are each independently hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 heteroalkyl group, a substituted or unsubstituted C6-C30 aryl group, or a substituted or unsubstituted C4-C30 heteroaryl group, and $X_1$ and $X_2$ are each independently $(CH_2CH_2O)_nH$, $(CH(CH_3)CH_2)_nH$ or $(CH_2CH_2O)_{m1}(CH(CH_3)CH_2)_{m2}H$, n and m1+m2 are each independently an integer of 1 to 10, and m1 and m2 are each independently an integer of 1 to 9.

2. The ink composition of claim 1, wherein a content of benzophenon polyoxyethylene glycol-based compound is about 0.1 to about 20 parts by weight, a content of the colorant is about 0.1 to about 15 parts by weight, and a content of the solvent is about 70 to about 90 parts by weight respectively based on 100 parts by weight of a total weight of the ink composition.

3. The ink composition of claim 1, wherein the surfactant further comprises at least one compound selected from the group consisting of compounds represented by Chemical Formula 2 through 5 illustrated below in a content of about 0.1 to about 15 parts by weight based on 100 parts by weight of a total weight of the ink composition;

<Chemical Formula 2>

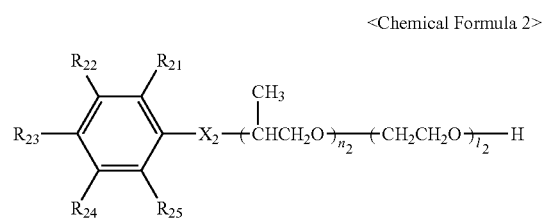

where $R_{21}$, $R_{22}$, $R_{23}$, $R_{24}$, and $R_{25}$ are each independently hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 hetero-alkyl group, a substituted or unsubstituted C6-C30 aryl group, or a substituted or unsubstituted C4-C30 hetero-aryl group, $X_2$ is a single bond, oxygen, sulphur, $NR_{26}$, a substituted or unsubstituted C1-C20 alkylene group, a substituted or unsubstituted C1-C20 hetero-alkylene group, a substituted or unsubstituted C6-C30 arylene group, a substituted or unsubstituted C4-C30 heteroarylene group, a substituted or unsubstituted C2-C20 alkenylene group, a substituted or unsubstituted C2-C20 hetero-alkenylene group, a substituted or unsubstituted C3-C30 cycloalkylene group, a substituted or unsubstituted C7-C30 aralkylene group, a carbonyl group, or an ester group, and $R_{26}$ is hydrogen, halogen, substituted or unsubstituted C1-C20 alkyl group, a substituted or unsubstituted C1-C20 alkoxy group, a substituted or unsubstituted C1-C20 heteroalkyl group, and $I_2$ and $n_2$ are each independently an integer of 0 to 100, and at least one of them is 1 or an integer greater than 1;

<Chemical Formula 3>

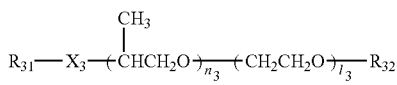

where $R_{31}$ and $R_{32}$ are each independently the same as $R_{21}$, $X_3$ is the same as $X_2$, and $I_3$ and $n_3$ are each independently an integer of 0 to 100, and at least one of them is 1 or an integer greater than 1;

<Chemical Formula 4>

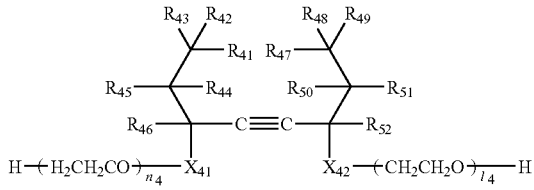

where $R_{41}$, $R_{42}$, $R_{43}$, $R_{44}$, $R_{45}$, $R_{46}$, $R_{47}$, $R_{48}$, $R_{49}$, $R_{50}$, $R_{51}$, and $R_{52}$ are each independently the same as $R_{21}$, $X_{41}$ and $X_{42}$ are each independently the same as $X_2$, and $I_4$ and $n_4$ are each independently an integer of 0 to 100, and at least one of them is 1 or an integer greater than 1;

<Chemical Formula 5>

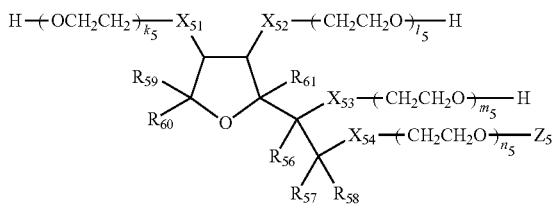

where $R_{56}$, $R_{57}$, $R_{58}$, $R_{59}$, $R_{60}$, and $R_{61}$ are each independently the same as $R_{21}$, $Z_5$ is the same as $R_{21}$, $X_{51}$, $X_{52}$, $X_{53}$ and $X_{54}$ are each independently the same as $X_2$, and $k_5$, $I_5$, $m_5$, and $n_5$ are each independently an integer of 0 to 100, and at least one of them is 1 or an integer greater than 1.

4. The ink composition of claim 3, wherein the surfactant further comprises the compound of Chemical Formula 4.

5. The ink composition of claim 1, wherein the ink composition has a viscosity of about 1.5 to about 20 cps.

6. The ink composition of claim 1, wherein the ink composition has a dynamic surface tension of about 20 to about 40 dyne/cm at 0 Hz, and a dynamic surface tension difference between a dynamic surface tension at 15 Hz and that of at 0 Hz is 0 to about 30 dyne/cm.

7. The ink composition of claim 1, wherein the colorant is a dye, a pigment, or a self-dispersing type pigment.

8. The ink composition of claim 1, wherein the solvent is water, a water miscible organic solvent, or a mixture of these solvents.

9. The ink composition of claim 8, wherein the water miscible solvent is at least one selected from the group consisting of a monohydric alcohol solvent, a ketone solvent, an ester solvent, a polyhydric solvent, a polyhydric alcohol derivative solvent, a nitrogen-containing solvent, and a sulfur-containing solvent.

10. The ink composition of claim 8, wherein the content of the water-miscible solvent is about 0.1 to about 130 parts by weight based on 100 parts by weight of water.

11. A multi-color ink set having an ink composition of inkjet recording, wherein the ink composition comprises at least one surfactant containing benzophenone polyoxyethylene glycol-based compound as illustrated in Chemical Formula 1 below;

a colorant; and a solvent,

<Chemical Formula 1>

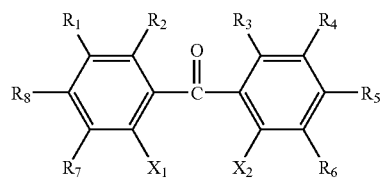

where $R_1$, $R_2$, $R_3$, $R_4$, $R_5$, $R_6$, $R_7$, and $R_8$ are each independently hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 heteroalkyl group, a substituted or unsubstituted C6-C30 aryl group, or a substituted or unsubstituted C4-C30 heteroaryl group, and $X_1$ and $X_2$ are each independently $(CH_2CH_2O)_nH$, $(CH(CH_3)CH_2)_nH$ or $(CH_2CH_2O)_{m1}(CH(CH_3)CH_2)_{m2}H$, n and m1+m2 are each independently an integer of 1 to 10, and m1 and m2 are each independently an integer of 1 to 9, wherein the multi-color ink set comprises at least two ink compositions having different colors from each other.

12. The multi-color ink set of claim 11, wherein a content of benzophenon polyoxyethylene glycol-based compound is about 0.1 to about 20 parts by weight, a content of the colorant is about 0.1 to about 15 parts by weight, and a content of the solvent is about 70 to about 90 parts by weight respectively based on 100 parts by weight of a total weight of the ink composition.

13. The multi-color ink set of claim 11, wherein the surfactant further comprises at least one compound selected from the group consisting of compounds represented by Chemical Formula 2 through 5 illustrated below in a content of about 0.1 to about 15 parts by weight based on 100 parts by weight of a total weight of the ink composition;

<Chemical Formula 2>

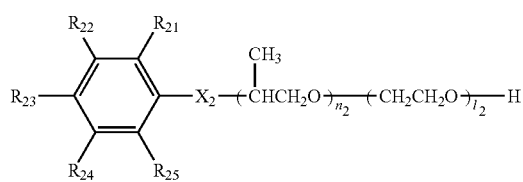

where $R_{21}$, $R_{22}$, $R_{23}$, $R_{24}$, and $R_{25}$ are each independently hydrogen, halogen, a carboxyl group, a cyano group, an amino group, a substituted or unsubstituted C1-C20 alkyl group, a substituted or unsubstituted C1-C20 alkoxy group, a substituted or unsubstituted C1-C20 hetero-alkyl group, a substituted or unsubstituted C6-C30 aryl group, or a substituted or unsubstituted C4-C30 hetero-aryl group, $X_2$ is a single bond, oxygen, sulphur, $NR_{26}$, a substituted or unsubstituted C1-C20 alkylene group, a substituted or unsubstituted C1-C20 hetero-alkylene group, a substituted or unsubstituted C6-C30 arylene group, a substituted or unsubstituted C4-C30 heteroarylene group, a substituted or unsubstituted C2-C20 alkenylene group, a substituted or unsubstituted C2-C20 hetero-alkenylene group, a substituted or unsubstituted C3-C30 cycloalkylene group, a substituted or unsubstituted C7-C30 aralkylene group, a carbonyl group, or an ester group, and $R_{26}$ is hydrogen, halogen, substituted or unsubstituted C1-C20 alkyl group, a substituted or unsubstituted C1-C20 alkoxy group, a substituted or unsubstituted C1-C20 heteroalkyl group, and $I_2$ and $n_2$ are each independently an integer of 0 to 100, and at least one of them is 1 or an integer greater than 1;

<Chemical Formula 3>

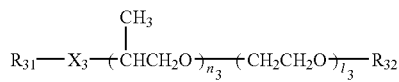

where $R_{31}$ and $R_{32}$ are each independently the same as $R_{21}$, $X_3$ is the same as $X_2$, and $I_3$ and $n_3$ are each independently an integer of 0 to 100, and at least one of them is 1 or an integer greater than 1;

<Chemical Formula 4>

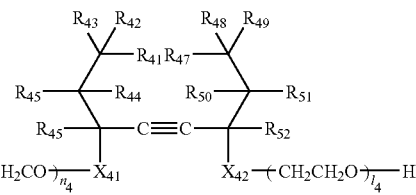

where $R_{41}$, $R_{42}$, $R_{43}$, $R_{44}$, $R_{45}$, $R_{46}$, $R_{47}$, $R_{48}$, $R_{49}$, $R_{50}$, $R_{51}$, and $R_{52}$ are each independently the same as $R_{21}$, $X_{41}$ and $X_{42}$ are each independently the same as $X_2$, and $I_4$ and $n_4$ are each independently an integer of 0 to 100, and at least one of them is 1 or an integer greater than 1;

<Chemical Formula 5>

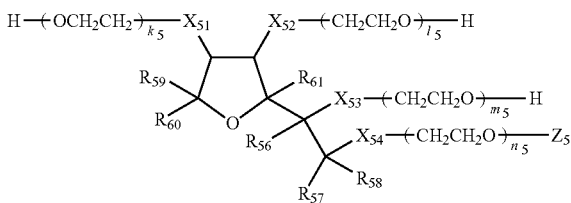

where $R_{56}$, $R_{57}$, $R_{58}$, $R_{59}$, $R_{60}$, and $R_{61}$ are each independently the same as $R_{21}$, $Z_5$ is the same as $R_{21}$, $X_{51}$, $X_{52}$, $X_{53}$ and $X_{54}$ are each independently the same as $X_2$, and $k_5$, $I_5$, $m_5$, and $n_5$ are each independently an integer of 0 to 100, and at least one of them is 1 or an integer greater than 1.

14. The multi-color ink set of claim 13, wherein the surfactant further comprises the compound of Chemical Formula 4.

15. The multi-color ink set of claim 11, wherein the ink composition has a viscosity of about 1.5 to about 20 cps.

16. The multi-color ink set of claim 11, wherein the ink composition has a dynamic surface tension of about 20 to about 40 dyne/cm at 0 Hz, and a dynamic surface tension difference between a dynamic surface tension at 15 Hz and that of at 0 Hz is 0 to about 30 dyne/cm.

17. The multi-color ink set of claim 11, wherein the colorant is a dye, a pigment, or a self-dispersing type pigment.

18. The multi-color ink set of claim 11, wherein the solvent is water, a water miscible organic solvent, or a mixture of these solvents.

19. A cartridge of inkjet recording, the cartridge comprises the multi-color ink set according to claim 11.

20. An inkjet recording apparatus having the cartridge of inkjet recording according to claim 12.

* * * * *